United States Patent Office 3,132,135
Patented May 5, 1964

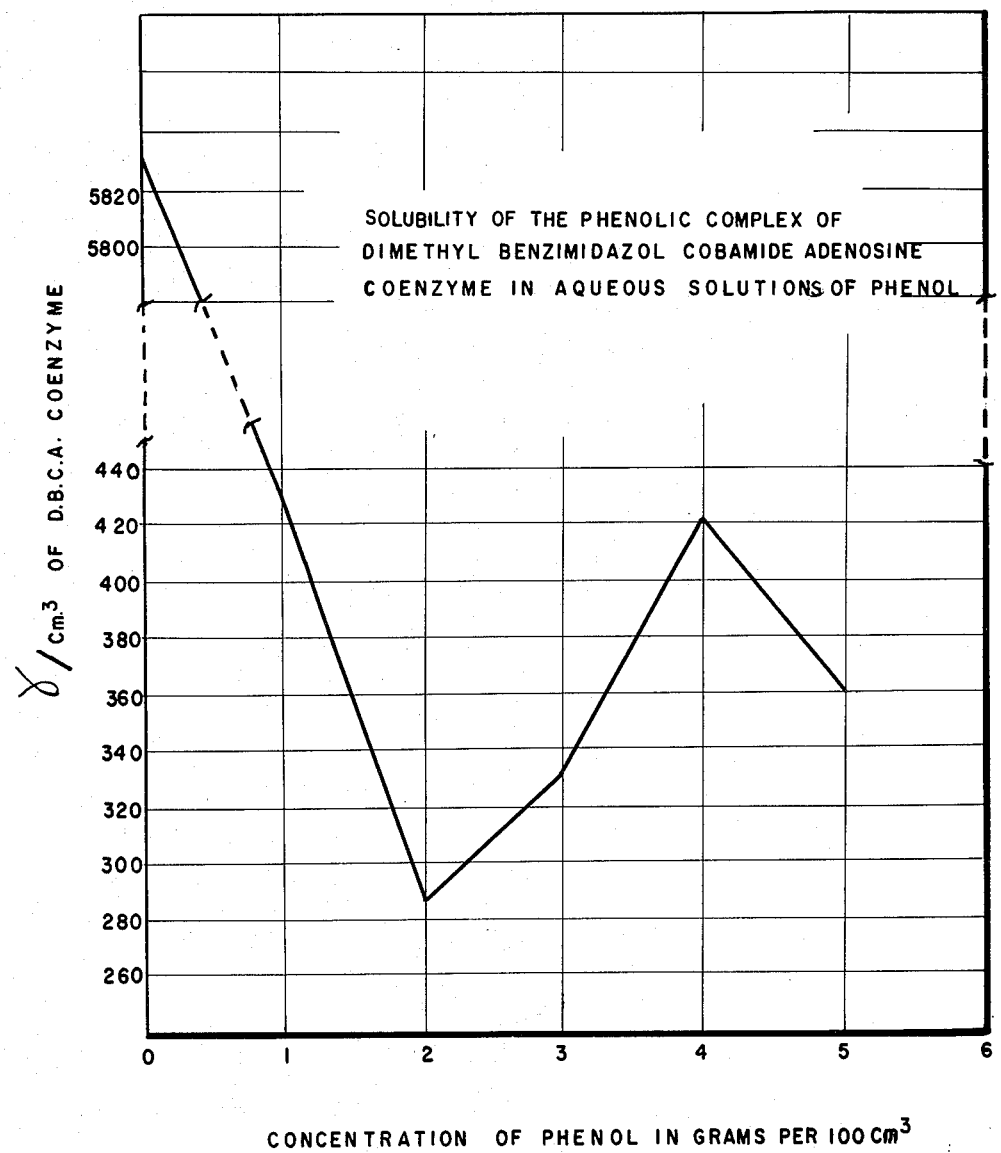

3,132,135
PREPARATION OF PURE DIMETHYL BENZIMID-
AZOL COBAMIDE ADENOSINE COENZYME
Gerard Nomine, Noisy le Sec, Lucien Penasse, Paris, and Pierre Barthelemy, Clichy-sous-Bois, France, assignors to Roussel-Uclaf, S.A., Paris, France, a corporation of France
Filed Jan. 21, 1963, Ser. No. 252,667
Claims priority, application France Jan. 22, 1962
6 Claims. (Cl. 260—211.5)

The invention relates to a novel process for obtaining pure dimethyl benzimidazol cobamide adenosine coenzyme which is a coenzymatic product of the vitamin $B_{12}$ family. The invention also relates to novel hydrated crystalline phenolic-dimethyl benzimidazol cobamide adenosine coenzyme complexes.

The structure of certain coenzymatic products of the vitamin $B_{12}$ family has been determined by Barker et al. (J. Biol. Chem., vol. 235, 1960, p. 181). The recovery of dimethyl benzimidazol cobamide adenosine coenzyme from a culture broth of Clostridium tetanomorphum consists of extracting the coenzyme from a previously concentrated aqueous solution with aqueous phenol, extracting the aqueous phenol extract with a mixture of acetone, water and ether followed by fractionation through a Dowex 50 resin column and a second phenol extraction. This recovery process is not only laborious but also results in a considerable loss in the coenzyme.

It is an object of the invention to provide a novel economical process for the recovery of pure dimethyl benzimidazol cobamide adenosine coenzyme.

It is another object of the invention to provide novel hydrated crystalline complexes of dimethyl benzimidazol cobamide adenosine coenzyme and phenolic compounds.

These and other advantages and objects of the invention will become obvious from the following detailed description.

The process of the invention for the recovery of pure dimethyl benzimidazol cobamide adenosine coenzyme comprises adding to an aqueous solution having a minimum concentration of 0.05% of dimethyl benzimidazol cobamide adenosine coenzyme an amount of a phenol having the formula

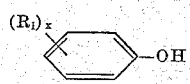

wherein $R_1$ is at least one member selected from the group consisting of hydroxy, lower alkyl and hydroxy lower alkyl and $x$ is an integer from 0 to 2 less than its solubility limit in water to form a hydrated crystalline complex of dimethyl benzimidazol cobamide adenosine coenzyme and the phenol having the formula

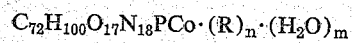

wherein R is the phenolic compound, $n$ is an integer from 1 to 3 and $m$ is an integer from 2 to 10, redissolving the hydrated crystalline complex in an aqueous solvent and precipitating pure dimethyl benzimidazole cobamide adenosine coenzyme from the resulting solution.

Examples of suitable phenolic compounds which may be added to the aqueous solution of dimethyl benzimidazol cobamide adenosine coenzyme are phenol, hydroxylated phenols, such as resorcinol, hydroquinone, phloroglucinol, etc.; hydroxymethylated phenols, such as saligenol; and hydroxy methyl phenols, such as orcinol.

The concentration of the phenolic compound to be added to the aqueous solution of dimethyl benzimidazol cobamide adenosine coenzyme must be below the solubility limit of the phenolic compound in water in order to form the hydrated crystalline complexes. For example, preferred amounts of some phenolic compounds are 2 to 3% of phenol, about 5% of resorcinol or hydroquinone and about 4% of saligenol.

The aqueous solutions of dimethyl benzimidazol cobamide adenosine coenzyme to which the phenolic compound is to be added must have a concentration of at least 0.05% of the said coenzyme. If the coenzyme concentration is below this value, the hydrated crystalline complexes will not form due to its solubility in aqueous solutions in this range. The said aqueous solutions can be obtained by preliminary processing by extraction and purification of culture growths of micro-organisms.

The hydrated crystalline complexes of dimethyl benzimidazol cobamide adenosine coenzyme-phenolic compound correspond to the generic formula

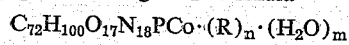

wherein $n$ is an integer from 1 to 3, $m$ is an integer from 2 to 10 and R is a phenol having the formula

wherein $R_1$ is at least one member of the group consisting of hydroxy, lower alkyl and hydroxy lower alkyl and $x$ is an integer from 0 to 2. $R_1$ is preferably hydroxy, methyl and/or hydroxymethyl.

The hydrated crystalline complexes are slightly soluble in cold water but are quite soluble in aqueous solvents, such as aqueous acetone, aqueous dioxane or aqueous tetrahydrofuran at 50° C. Dimethyl benzimidazol cobamide adenosine coenzyme can be precipitated in a pure state from these solutions by the addition of a water miscible solvent, such as acetone or dioxane or tetrahydrofuran and ethanol in yields of better than 80%.

Dimethyl benzimidazol cobamide adenosine coenzyme is active in catalyzing the conversion of glutamate to β-methyl aspartate and mesaconate.

Referring now to the drawing—

FIG. 1 is a graph showing the solubility of the complex of phenol and dimethyl benzimidazol cobamide adenosine coenzyme in aqueous solutions of phenol.

In the following examples there are described several preferred embodiments to illustrate the invention. However, it should be understood that the invention is not intended to be limited to the specific embodiments.

EXAMPLE I

Dimethyl Benzimidazol Cobamide Adenosine Coenzyme Recovery With Phenol

Step A.—Formation of the hydrated phenol complex: 112 mg. of dimethyl benzimidazol cobamide adenosine coenzyme, being 89.5% coenzyme and 9.9% water were dissolved in darkness in 6 cc. of distilled water. 3 cc. of an aqueous solution of 6% phenol were added to the said solution to obtain a concentration of 2% of phenol in the final solution. The crystallization was brought on, if necessary, by scratching the side of the container with a glass agitator and the crystallization was permitted to go to completeness by standing in darkness at room temperature for a period of about 48 hours. The crystals of the hydrated phenolic complex formed were vacuum filtered, dried over phosphoric acid anhydride, washed with ether and dried over potassium hydroxide. 88 mg. of a hydrated phenol-dimethyl benzimidazol cobamide adenosine coenzyme complex were obtained which occurred in the form of red crystals. The crystals were slightly soluble in water and insoluble for the most part in the usual organic solvents, such as alcohol, ether, acetone, benzene and chloroform.

The said complex had the following empirical formula:

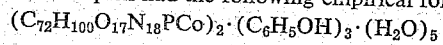

and it could be dehydrated under vacuum at 100° C.

Upon dehydration under vacuum at 100° C., the said complex had a 5.45% loss in weight which was the amount of water removed. Phenol was not eliminated in the drying treatment. The dried complex contained 7.9% phenol determined by colorimetry and had a purity of 98±1%.

U.V. SPECTRA IN AQUEOUS SOLUTION

| $\lambda$ max., m$\mu$ | $E_{1\,cm.}^{1\%}$ after dehydration |
|---|---|
| 522 | 46.0 |
| 375 | 61.2 |
| 340 | 72.4 |
| 315 | 74.2 |
| 288 | 100.9 |
| 262 | 201.0 |

This product is not described in the literature.

*Step B.—Decomposition of the phenol complex:* 80 mg. of the complex of phenol-dimethyl benzimidazol cobamide adenosine coenzyme were dissolved in 10 parts of acetone containing 50% water. The mixture was heated to 50° C. and then 80 parts of anhydrous acetone were added thereto. The dimethyl benzimidazol cobamide adenosine coenzyme crystallized and 66 mg. (95% yield) of dimethyl benzimidazol cobamide adenosine coenzyme whose phenol content determined by colorimetry was less than 0.4% and having a purity of 99.5% were obtained.

EXAMPLE II

*Dimethyl Benzimidazol Cobamide Adenosine Coenzyme Recovery With Phenol From Raw Concentrates*

20 liters of an aqueous concentrate of a culture broth of *Propionibacterium Shermanii* containing about 20 gm. of dimethyl benzimidazol cobamide adenosine coenzyme were obtained by the method of Barker et al. (J. Biol. Chem., vol. 235, 1960, p 482). The culture broth starting from 152 kg. of moist cellular paste was extracted with ethanol, treated with Dowex 50 Na$^+$, then with Dowex 2 OH$^-$, extracted with phenol and fractionated on Dowex 50 at a pH of 3.

10.0 liters of an aqueous solution containing 6% phenol were added to the 20 liters of the said aqueous concentrate and the solutions were mixed to form an aqueous solution having a concentration of 2% phenol. Crystallization of the hydrated complex of phenol-dimethyl benzimidazol cobamide adenosine coenzyme was induced by scratching the side walls of the container and the solution was allowed to stand in the dark at room temperature for 72 hours to complete the crystallization. The crystals formed were vacuum filtered and washed with an aqueous solution containing 2% phenol.

The washed crystals were then added to a 50% aqueous acetone solution heated to 50° C. and maintained at this temperature for several minutes until complete solution of the crystals occurred. After the addition of 80 parts of acetone to the solution, 17.5 gm. of dimethyl benzimidazol cobamide adenosine coenzyme crystallized and the said crystals were determined by spectrophotometry to be 96 to 100% pure.

EXAMPLE III

*Dimethyl Benzimidazol Cobamide Adenosine Coenzyme Recovery With Resorcinol*

*Step A.—Formation of the hydrated resorcinol complex:* 100 mg. of dimethyl benzimidazol cobamide adenosine coenzyme were dissolved in darkness in 5 cc. of distilled water heated to 50° C. 5 cc. of an aqueous solution containing 10% of resorcinol, heated to 50° C. were added to the said solution. The mixture was homogenized and allowed to stand for a period of one month in darkness at room temperature. The crystals of the hydrated complex of resorcinol-dimethyl benzimidazol cobamide adenosine coenzyme formed were vacuum filtered and dried at room temperature under vacuum in the presence of potassium hydroxide. The dry crystals were washed three times by placing them in suspension in 10 cc. of ether and drying them at room temperature under vacuum in the presence of potassium hydroxide. The hydrated crystalline complex had the following empirical formula $$C_{72}H_{100}O_{17}N_{18}PCo \cdot (C_6H_4(OH)_2)_3 \cdot (H_2O)_8$$

and it had a water content of 7.15% (calculated 7.04%).
This product is not described in the literature.

*Step B.—Decomposition of the hydrated resorcinol complex:* 20 mg. of the hydrated dimethyl benzimidazol cobamide adenosine coenzyme resorcinol complex were dissolved in 10 parts of acetone containing 50% of water. The mixture was heated to 50° C. and then 80 parts of anhydrous acetone were added thereto. Pure dimethyl benzimidazol cobamide adenosine coenzyme was obtained in crystalline form with a yield of 93%.

EXAMPLE IV

*Dimethyl Benzimidazol Cobamide Adenosine Coenzyme Recovery With Hyroquinone*

*Step A.—Formation of the hydrated hydroquinone complex:* 200 mg. of dimethyl benzimidazol cobamide adenosine coenzyme were dissolved in darkness in 20 cc. of aqueous solution containing 5% of hydroquinone, heated to 60 to 70° C. This solution was allowed to stand at room temperature for a period of one week in total darkness. The crystals formed were vacuum filtered and dried at room temperature under vacuum in the presence of potassium hydroxide. The dried crystals were washed three times by placing them in suspension in 10 cc. of ether and drying them at room temperature under vacuum in the presence of potassium hydroxide. 205 mg. of the hydrated dimethyl benzimidazol cobamide adenosine coenzyme hydroquinone complex were obtained in the form of red crystals.

The complex was soluble in water in an amount of about 2 parts per thousand. It was decomposed by dilute aqueous alkalis and was slightly soluble in ethanol and insoluble in ether, acetone, benzene and chloroform. The complex product had the following empirical formula:

$$(C_{72}H_{100}O_{17}N_{18}PCo)_2 \cdot (C_6H_4(OH)_2)_3 \cdot (H_2O)_8$$

Its water content was 4.1% (calculated 4.85%).
This product is not described in the literature.

*Step B.—Decomposition of the hydrated hydroquinone complex:* 100 mg. of hydrated dimethylbenzimidazol cobamide adenosine coenzyme-hydroquinone complex were dissolved in 10 parts of acetone containing 50% of water, heated to 50° C. and then 80 parts of anhydrous acetone were added thereto. Pure dimethyl benzimidazol cobamide adenosine coenzyme crystallized from the solution and was obtained in a yield of 94%.

EXAMPLE V

*Dimethyl Benzimidazol Cobamide Adenosine Coenzyme Recovery With Saligenol*

*Step A.—Formation of the hydrated saligenol complex:* 100 mg. of dimethyl benzimidazol cobamide adenosine coenzyme were dissolved in total darkness in 2 cc. of distilled water heated to 50° C. 8 cc. of an aqueous solution containing 5% of saligenol were added to the solution obtained. The solution was allowed to stand for a period of one week in total darkness at room temperature to effect crystallization. The crystals formed were vacuum filtered and dried under vacuum at room temperature in the presence of potassium hydroxide. The crystals were washed three times by placing them in suspension in 10 cc. of ether and drying them at room temperature under vacuum in the presence of potassium hydroxide. The hydrated dimethyl benzimidazol cobamide adenosine coenzyme saligenol complex was obtained in the form of red crystals.

The complex was slightly soluble in water (about 2 parts per thousand). It was decomposed by dilute aqueous alkalis and was slightly soluble in dilute aqueous acids and in ethanol and insoluble in acetone, benzene and chloroform. The hydrated complex had the following empirical formula:

$$(C_{72}H_{100}O_{17}N_{18}PCo)_2 \cdot (C_6H_4(OH)CH_2OH)_3 \cdot (H_2O)_{10}$$

The water content was 4.9% (calculated 4.85%).

This product is not described in the literature.

*Step B.—Decomposition of the hydrated saligenol complex:* 40 mg. of the hydrated dimethyl benzimidazol cobamide adenosine coenzyme saligenol complex were dissolved in 10 parts of 50% aqueous acetone heated to 50° C. and then 80 parts of anhydrous acetone were added thereto. Pure dimethyl benzimidazol cobamide adenosine coenzyme crystals were obtained with a yield of 95%.

Various modifications of the process of the invention may be made without departing from the spirit or scope thereof and it is to be understood that the invention is intended to be limited only as defined in the appended claims.

We claim:

1. Hydrated crystalline dimethyl benzimidazol cobamide adenosine coenzyme-phenolic complexes having the formula $$C_{72}H_{100}O_{17}N_{18}PCo \cdot (R)_n \cdot (H_2O)_m$$

wherein R is a phenol having the formula

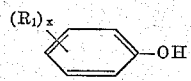

in which $R_1$ is at least one member selected from the group consisting of hydroxy, lower alkyl and hydroxy lower alkyl, $x$ is an integer from 0 to 2, $m$ is an integer from 2 to 10 and $n$ is an integer from 1 to 3.

2. Hydrated crystalline dimethyl benzimidazol cobamide adenosine coenzyme-phenolic complexes having the formula $$C_{72}H_{100}O_{17}N_{18}PCo \cdot (R)_n \cdot (H_2O)_m$$

wherein R is a phenol having the formula

in which $R_1$ is at least one member selected from the group consisting of hydroxy, methyl and hydroxymethyl, $x$ is an integer from 0 to 2, $m$ is an integer from 2 to 10 and $n$ is an integer from 1 to 3.

3. A hydrated crystalline dimethyl benzimidazol cobamide adenosine coenzyme-phenol complex having the formula $$(C_{72}H_{100}O_{17}N_{18}PCo)_2 \cdot (C_6H_5OH)_3 \cdot (H_2O)_5$$

4. A hydrated crystalline dimethyl benzimidazol cobamide adenosine coenzyme-resorcinol complex having the formula $$C_{72}H_{100}O_{17}N_{18}PCo \cdot [C_6H_4(OH)_2]_3 \cdot [H_2O]_8$$

5. A hydrated crystalline dimethyl benzimidazol cobamide adenosine coenzyme-hydroquinone complex having the formula $$[C_{72}H_{100}O_{17}N_{18}PCo]_2 \cdot [C_6H_4(OH)_2]_3 \cdot [H_2O]_8$$

6. A hydrated crystalline dimethyl benzimidazol cobamide adenosine coenzyme-saligenol complex having the formula $$[C_{72}H_{100}O_{17}N_{18}PCo]_2 \cdot [C_6H_4(OH)(CH_2OH)]_3 \cdot [H_2O]_{10}$$

References Cited in the file of this patent

UNITED STATES PATENTS

| | | |
|---|---|---|
| 2,823,165 | Bernhaver et al. | Feb. 11, 1958 |
| 2,984,661 | Nomine et al. | May 16, 1961 |